United States Patent
Jovin et al.

(10) Patent No.: US 10,969,573 B2
(45) Date of Patent: *Apr. 6, 2021

(54) SPATIO-TEMPORALLY LIGHT MODULATED IMAGING SYSTEM, METHOD FOR CONFOCAL IMAGING AN OBJECT AND CARRIER WHEEL DEVICE

(71) Applicant: Max-Planck-Gesellschaft zur Foerderung der Wissenschaften e. V., Munich (DE)

(72) Inventors: Thomas M. Jovin, Goettingen (DE); Anthony De Vries, Goettingen (DE); Tobias Freund, Wetzlar (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 169 days.

This patent is subject to a terminal disclaimer.

(21) Appl. No.: 16/087,863

(22) PCT Filed: Mar. 24, 2016

(86) PCT No.: PCT/EP2016/000521
§ 371 (c)(1),
(2) Date: Sep. 24, 2018

(87) PCT Pub. No.: WO2017/162257
PCT Pub. Date: Sep. 28, 2017

(65) Prior Publication Data
US 2019/0107710 A1    Apr. 11, 2019

(51) Int. Cl.
*G02B 26/00*   (2006.01)
*G02B 7/00*    (2021.01)
(Continued)

(52) U.S. Cl.
CPC ......... *G02B 26/008* (2013.01); *G02B 7/006* (2013.01); *G02B 21/0024* (2013.01); *G02B 26/0833* (2013.01); *G02B 27/1006* (2013.01)

(58) Field of Classification Search
CPC ................ G02B 7/006; G02B 21/0024; G02B 27/1006; G02B 26/008; G02B 26/0833
(Continued)

(56) References Cited

U.S. PATENT DOCUMENTS 2,625,851 A * 1/1953 Gelb .................. G03B 19/07
355/69
4,320,976 A * 3/1982 Obertegger ........... G03B 27/73
355/38
(Continued)

FOREIGN PATENT DOCUMENTS

DE          284857 A5    11/1990
DE     102012003984 A1    8/2013
(Continued)

OTHER PUBLICATIONS

International Search Report for corresponding PCT Application No. PCT/EP2016/000521 dated Feb. 3, 2017.
(Continued)

*Primary Examiner* — William R Alexander
(74) *Attorney, Agent, or Firm* — Caesar Rivise, PC

(57) ABSTRACT

A spatio-temporally light modulated imaging system for confocal imaging an object includes a light modulating micro-mirror device, an imaging optic, and a camera device, wherein a carrier wheel device is provided for carrying multiple pairs of first and second dichroic beam splitters and multiple pairs of first and second emission filters, wherein the carrier wheel device is adjustable in multiple operational positions relative to the first and second optical axes, and wherein a casing is provided. Furthermore, a carrier wheel
(Continued)

Figure 1:
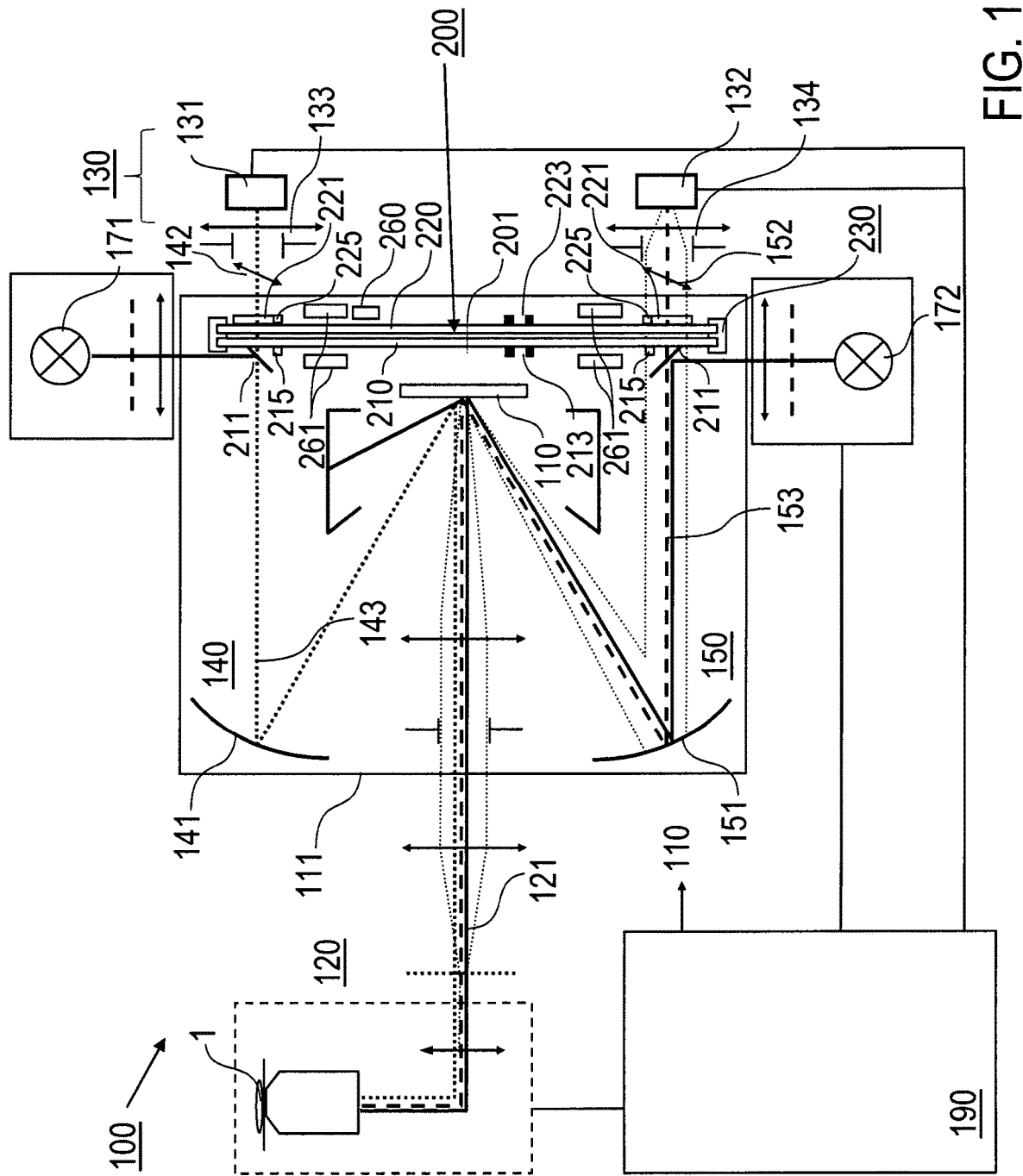

device for carrying optical members and a method for confocal imaging an object are disclosed.

31 Claims, 4 Drawing Sheets

(51) Int. Cl.
 G02B 21/00 (2006.01)
 G02B 26/08 (2006.01)
 G02B 27/10 (2006.01)
(58) Field of Classification Search
 USPC ............................................... 359/892
 See application file for complete search history.

(56) References Cited

U.S. PATENT DOCUMENTS

| | | | | |
|---|---|---|---|---|
| 4,774,551 A * | 9/1988 | Amos | ................ | G03B 27/735 355/38 |
| 6,002,488 A * | 12/1999 | Berg | ................ | G01J 3/0251 356/418 |
| 6,373,073 B1 * | 4/2002 | Clancy | ................ | G02B 26/008 250/504 R |
| 8,937,720 B2 * | 1/2015 | Russell | ................ | G01J 3/02 356/418 |
| 9,279,971 B2 | 3/2016 | Jovin et al. | | |
| 2006/0007686 A1 | 1/2006 | Hough | | |
| 2006/0279708 A1 * | 12/2006 | Silverstein | ................ | H04N 9/315 353/84 |
| 2007/0086098 A1 | 4/2007 | Sekiguchi et al. | | |
| 2007/0247668 A1 * | 10/2007 | Fuchs | ................ | G01N 21/95623 358/3.03 |
| 2011/0284767 A1 | 11/2011 | Wolleschensky et al. | | |
| 2013/0063586 A1 * | 3/2013 | Jovin | ................ | G02B 26/0833 348/79 |
| 2013/0176622 A1 | 7/2013 | Abrahamson et al. | | |
| 2013/0270440 A1 | 10/2013 | Russell | | |
| 2014/0104713 A1 | 4/2014 | Lane et al. | | |
| 2014/0226306 A1 | 8/2014 | Khan et al. | | |
| 2014/0268795 A1 | 9/2014 | Calmes | | |
| 2014/0347461 A1 | 11/2014 | Kleppe et al. | | |
| 2019/0107698 A1 * | 4/2019 | Jovin | ................ | G02B 21/0048 |

FOREIGN PATENT DOCUMENTS

| | | |
|---|---|---|
| EP | 0911667 A1 | 4/1999 |
| EP | 0916981 A1 | 5/1999 |
| EP | 2369401 A1 | 9/2011 |
| JP | 2001208981 A | 8/2001 |
| JP | 2003195177 A | 7/2003 |
| JP | 2008128894 A | 6/2008 |
| JP | 2010175774 A | 8/2010 |
| JP | 2011194275 A | 10/2011 |
| JP | 2013120271 A | 6/2013 |
| JP | 2013522684 A | 6/2013 |

OTHER PUBLICATIONS

English abstract of DE102012003984A1.
English abstract of JP2001208981A.
English abstract of JP2003195177A.
English abstract of JP2008128894A.
English abstract of JP2010175774A.
English abstract of JP2011194275A.
English abstract of JP2013120271A.
Decision for Patent for related Japanese Patent Application No. 2018-550350 dated Dec. 8, 2020.

* cited by examiner

SPATIO-TEMPORALLY LIGHT MODULATED IMAGING SYSTEM, METHOD FOR CONFOCAL IMAGING AN OBJECT AND CARRIER WHEEL DEVICE

CROSS REFERENCE TO RELATED APPLICATIONS

This application is the U.S. National Phase Application of PCT/EP2016/000521, filed Mar. 24, 2016, the contents of which is incorporated herein by reference in its entirety for all purposes.

The invention relates to a spatio-temporally light modulated imaging system, which in particular is configured for confocal imaging an object under investigation. Furthermore, the invention relates to a method of confocal imaging an object using the spatio-temporally light modulated imaging system. Furthermore, the invention relates to a carrier wheel device for supporting optical members, in particular a filter wheel device, being included in the spatio-temporally light modulated imaging system or in another optical system. Applications of the invention are available e. g. in the fields of confocal microscopy and/or spectroscopy.

Figure 4:
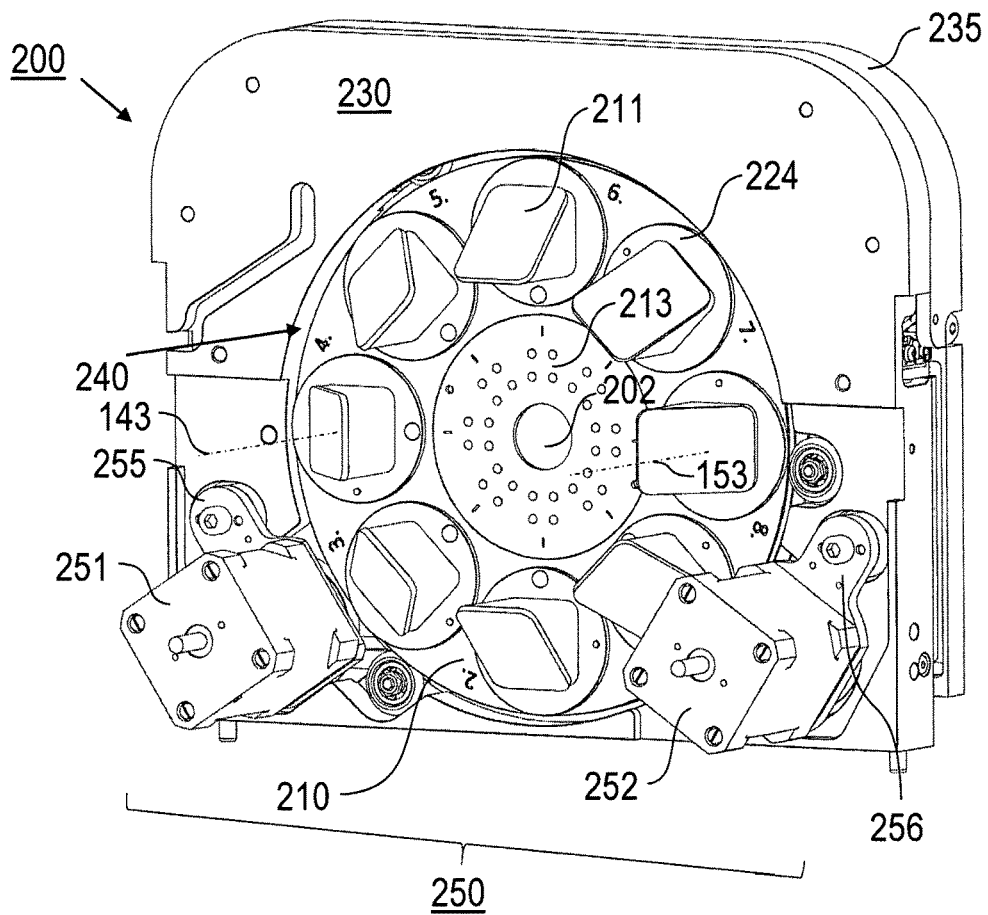

EP 2 369 401 A1 discloses a spatio-temporally light modulated imaging system (Programmable array microscope, PAM), comprising a light modulating micro-mirror device, an imaging optic, at least one optical relaying device and a camera device including at least one detector camera, e.g. as shown in FIGS. 1 and 4 of EP 2 369 401 A1. These components are configured and operated for implementing confocal (or: optical sectioning) microscopy techniques using point or pattern scanning systems with conjugate pairs of illumination and detection apertures for collecting light generated in response to an illumination in a focal plane within the object under investigation. Scanning systems using spatial light modulators, like a micro-mirror device (or: "DMD", Digital Mirror Device) employ the DMD with a pattern sequence of illumination spots focused to conjugate locations in the focal plane of the object, while simultaneously collecting detection light from the conjugate locations with a detector camera and separately and simultaneously collecting detection light emanating from non-conjugate ("out-of-focus") locations in the sample, as described in EP 911 667 A1 and EP 916 981 A1. Combining the signals of the conjugate and non-conjugate images provides optical sectioned images to be obtained. The spatio-temporally light modulated imaging system uses a dual path system that goes beyond the conventional confocal configuration in that the "rejected" signal is also retained and utilized, so that the confocal imaging obtained is called optical sectioning imaging. Although the conventional imaging system employing the DMD provides substantial advantages in terms of data acquisition speed, spatial resolution and optical efficiency, the practical application of the imaging system is restricted due to the following limitations.

Firstly, the conventional imaging system of EP 2 369 401 A1 has a complex optical set-up including extended optical path length between the components, resulting in a large structure with a footprint of about 1 m². The extended path length between the components was considered to be necessary for having enough space in order to adapt the imaging system to different microscopy imaging tasks. In particular, imaging different objects with specific compositions requires an adaptation of the illumination light wavelength range and the detection wavelength range of the at least one detector camera. As the illumination light and the detected light travel along common optical axes, exchangeable dichroic reflectors and emission filters are required, which need sufficient space for exchange and alignment thereof in the conventional imaging system. Furthermore, due to the needs for adapting the conventional imaging system to the imaging task, it was provided as an open structure to be used in a darkened environment. Consequently, the conventional imaging system was adapted for laboratory use by specialized users only.

The above limitation do not occur with the described spatio-temporally light modulated imaging system only, but also with other optical systems, like microscopes or spectroscopy devices, having a complex optical set-up and requiring exchangable optical members, like e. g. filters or dichroic beam splitters.

The objective of the invention is to provide an improved spatio-temporally light modulated imaging system, which is capable of avoiding limitations of conventional imaging systems. In particular, the imaging system is to be provided with a reduced size, an extended range of applications in laboratory or industry, reduced requirements to the skill of the user, and/or simplified capabilities for adapting the imaging system to different imaging tasks. Furthermore, the objective of the invention is to provide an improved method of confocal imaging (optical sectioning imaging) an object avoiding limitations of conventional confocal imaging with an illumination of the object with a pattern sequence of illumination spots. Furthermore, the objective of the invention is to provide an improved carrier wheel device, which is capable of avoiding limitations of conventional optical systems. In particular, the carrier wheel device is to be capable of providing a compact system structure and high flexibility in adapting an optical system to different tasks.

These objectives are solved with an imaging system, a method of confocal imaging and a carrier wheel device comprising the features of the independent claims. Preferred embodiments and applications of the invention are defined in the dependent claims.

According to a first general aspect of the invention, the above objective is solved by a spatio-temporally light modulated imaging system, which in particular is configured for confocal imaging an object under investigation, using an illumination of the object with a pattern sequence of illumination spots focused to conjugate locations in the focal plane of the object while simultaneously collecting detection light from the conjugate locations as well as some light signals from non-conjugate ("out-of-focus") positions with a camera device. To this end, the imaging system includes a light modulating micro-mirror device, like a DMD, an imaging optic, first and second optical relaying devices and a camera device. The mirror elements of the light modulating micro-mirror device not used for illumination collect light exclusively from non-conjugate ("out-of-focus") positions. The suitable combination of the signals acquired along first and second optical axes of the imaging system yields an optically-sectioned ("confocal") image. Optionally, the imaging system may include an illumination device as an integrated component. Alternatively, the imaging system can be combined with a separate illumination device.

The imaging optic is arranged for focusing illumination light travelling along a modulator optical axis perpendicular to the modulator plane from the micro-mirror device to the object under investigation and directing detection light created in the object in response to the illumination along the modulator optical axis towards the micro-mirror device. Each of the mirror elements of the micro-mirror device is arranged as a reflector between the modulator optical axis and one of a first and a second optical relaying device, which define a first and a second optical axis towards the camera device. Simultaneously, the first and second optical relaying devices are used for directing the illumination light coupled via dichroic beam splitters onto the first and second optical axis towards the micro-mirror device.

The camera device is arranged for collecting the detection light travelling via the mirror elements of the micro-mirror device and one of the first and second optical relaying devices along one of the first and second optical axes. Emission filters are arranged in the first and second optical axes between the dichroic beam splitters and the camera device in order to block illumination light back-scattered in the object under investigation.

Furthermore, the imaging system is provided with a control device, which is arranged for controlling the micro-mirror device, the camera device and the illumination device such that the object is illuminated with a pattern sequence of illumination spots and detection light is collected from different regions within the object, so that confocal images can be reconstructed on the basis of the collected detection light.

According to the invention, the imaging system further comprises a carrier wheel device being arranged for carrying multiple pairs of first and second dichroic beam splitters and multiple pairs of first and second emission filters and being adjustable such that one of the pairs of first and second dichroic beam splitters and one of the pairs of first and second emission filters simultaneously are arranged in the first and second optical axes, respectively. Preferably, the first and second dichroic beam splitters of each pair have equal spectral characteristics, i.e. equal wavelength ranges being reflected or transmitted, respectively, and/or the first and second emission filters of each pair have equal spectral characteristics, i.e. equal cut-off wavelengths, respectively. Alternatively, for other applications, e. g. for the acquisition of emission spectra, the opposing filters and/or beam splitters can have different spectral characteristics for obtaining optical sectioning on the basis of the images collected.

The carrier wheel device has multiple operational positions wherein in each operational position a different one of the pairs of first and second dichroic beam splitters is arranged in the first and second optical axes for directing illumination light from first and second input ports, in particular from first and second light source devices, onto the first and second optical axes towards the first and second optical relaying devices and further to the micro-mirror device, respectively. Simultaneously, a different one of the pairs of first and second emission filters is arranged with each operational position in the first and second optical axes in a section thereof between the pair of first and second dichroic beam splitters and the camera device, respectively.

Advantageously, the selected pair of first and second dichroic beam splitters and the selected pair of first and second emission filters can be arranged adjacent to each other with the carrier wheel device, so that a first dichroic beam splitter and a first emission filter are arranged in the first optical axis and a second dichroic beam splitter and a second emission filter are arranged in the second optical axis. The carrier wheel device provides a compact arrangement of the dichroic beam splitters and emission filters and is adapted for switching to different pairs of dichroic beam splitters and/or different pairs of emission filters by adjusting the operational position of the carrier wheel device. Accordingly, the whole optical set-up of the imaging system has a more compact structure. In particular, the size of the imaging system can be minimized with a footprint down to about 20 cm·30 cm.

Preferably, the carrier wheel device of the spatio-temporally light modulated imaging system has features of the carrier wheel device according the third general aspect of the invention outlined below.

Furthermore, according to the invention, the imaging device comprises a casing (or: main casing) enclosing the light modulating micro-mirror device, the first and second optical relaying devices and including the carrier wheel device, in particular rotatable wheels thereof. As a further substantial advantage of the invention, the compact structure of the imaging device including the carrier wheel device allows the accommodation of the micro-mirror device, the optical relaying devices and the carrier wheel device within the casing shielding light from the environment. The casing comprises opaque walls, including an imaging optic port for the imaging optic, and optionally at least one port for coupling of the camera device and two illumination ports for introducing the illumination light to the imaging system. Accordingly, the inventive imaging system can be operated in any illuminated environment. Furthermore, the casing provides a protection of the imaging system, so that any sensitivity against environmental effects is reduced. The carrier wheel device may comprise a carrier wheel casing, which preferably is coupled with the main casing of the imaging system, in particular providing one of the casing walls of the main casing.

According to a preferred embodiment of the invention, the carrier wheel device comprises two rotatable wheels (or: filter wheels), which are arranged adjacent to each other, while being rotatable independently of each other. A first rotatable wheel carries the pairs of first and second dichroic beam splitters. An even number of through holes is provided along an azimuthal direction of the first rotatable wheel, so that pairs of through holes are arranged in opposite relationship in a radial direction. The pairs of first and second dichroic beam splitters are arranged at the through holes of the first rotatable wheel such that the first and second dichroic beam splitters, preferably with equal spectral characteristics, are arranged in opposite relationship to each other. Alternatively, for some applications, the first and second dichroic beam splitters can have different spectral characteristics, e. g. the one of the dichroic beam splitters can comprise a glass plate. A second rotatable wheel carries the pairs of first and second emission filters. An even number of through holes is provided along an azimuthal direction of the second rotatable wheel, so that pairs of through holes are arranged in opposite relationship in a radial direction. The pairs of first and second emission filters are arranged at the through holes of the second rotatable wheel such that the first and second emission filters, preferably with equal spectral characteristics or alternatively with different spectral characteristics, are arranged in opposite relationship to each other.

The first and second rotatable wheels extend in a plane perpendicular to the modulator axes and first and second optical axes. The first and second rotatable wheels are arranged within the casing such that in each operational position one pair of through holes, each carrying first and second dichroic beam splitters and first and second emission filters, respectively, are arranged in the first and second optical axes, respectively. By turning the first and second rotatable wheels, other pairs of first and second dichroic beam splitters and first and second emission filters can be positioned in the first and second optical axes, respectively.

Advantageously, the provision of the first and second rotatable wheels offer an substantially facilitated exchange of dichroic beam splitters and emission filters, in particular in dependency on the imaging task, i.e. on the spectral properties of the object under investigation.

According to a particularly preferred embodiment of the invention, the carrier wheel device is arranged such that the selected pairs of dichroic beam splitters and emission filters are positioned around a location of minimum light beam diameters along the first and second optical axes, respectively. The first and second optical relaying devices being arranged for imaging the illumination light from the first and second dichroic beam splitters onto the micro-mirror device and for imaging illumination light from the micro-mirror device onto the first and second optical axes create light beams along the first and second optical axes having varying diameters. If the dichroic beam splitters and emission filters are arranged at the location of minimum light beam diameter or adjacent to this location, the size of the dichroic beam splitters and emission filters can be minimized. In particular, optical standard components with a cross-sectional dimension below 25 mm (free aperture 21 mm) can be used, resulting in reduced filter cost and larger selection of available filters, and a reduced size of the carrier wheel device, in particular the first and second rotatable wheels, and/or an increased number of pairs of dichroic beam splitters and emission filters.

According to a further preferred embodiment of the invention, the carrier wheel device comprises fitting frames, each of which being arranged for accommodating one of the dichroic beam splitters and emission filters. With the preferred provision of rotatable wheels, each fitting frame is positioned at one of the through holes. Advantageously, the fitting frames facilitate a precise positioning of the dichroic beam splitters and emission filters in the first and second optical axes. According to a preferred variant of this embodiment, the emission filters are mounted in the fitting frames using an isotropic spring loaded mechanism. Advantageously, the insertion of the emission filters to the fitting frames and a stress-free holding of the emission filters is obtained by employing the isotropic spring loaded mechanisms. According to a further preferred variant, the fitting frames can be individually inserted into or removed from the carrier wheel device, in particular the first and second rotatable wheels. Accordingly, with a particularly preferred embodiment of the invention, the first and second dichroic beam splitters and/or the first and second emission filters are exchangeable. Advantageously, this further extends the application range of the imaging system to additional spectral ranges and accordingly to additional imaging tasks.

According to a further advantageous embodiment of the invention, at least one of the first and second dichroic beam splitters and the first and second emission filters is attached in the respective fitting frame by the effect of magnetic forces. Accordingly, the fitting frames or the dichroic beam splitters and/or the emission filters are provided with magnetic elements and/or ferro-magnetic materials. Advantageously, holding the dichroic beam splitters and emission filters by magnetic forces facilitates the exchange thereof.

The dichroic beam splitters and/or the emission filters can be exchanged, while the carrier wheel device is arranged at the main casing of the imaging system. With this embodiment of the invention, the main casing or a carrier wheel casing of the carrier wheel device is provided with at least one access port being arranged such that the dichroic beam splitters and/or the emission filters can be provided on the carrier wheel device or removed therefrom.

According to an alternative, particularly preferred embodiment of the invention, at least of one the first and second rotatable wheels are removable from the casing. With this embodiment, the main casing or the carrier wheel casing of the carrier wheel device is provided with a carrier port (in particular cover lid of the carrier wheel casing) through which the at least one of the first and second rotatable wheels can be introduced into the casing or removed therefrom. Advantageously, this embodiment allows the simultaneous exchange of multiple dichroic beam splitters and/or emission filters. Furthermore, the carrier wheel device can be provided with the dichroic beam splitters and/or the emission filters before introducing it to the imaging system, so that mistakes in positioning the dichroic beam splitters or the emission filters at the correct locations on the first and/or second rotatable wheels can be avoided.

With the above preferred embodiment of providing two rotatable wheels, both rotatable wheels can be commonly removable from the casing, or the rotatable wheels are separately removable from the casing, or only one of the rotatable wheels is removable from the casing.

Preferably, at least one of the following features is provided for reducing mistakes in positioning the dichroic beam splitters and/or the emission filters at the carrier wheel device. According to a first variant, the carrier wheel device and/or the fitting frames can be provided with a unique identification device, like e.g. an RFID chip, which is readable by a reader device included in the casing. Advantageously, controlling the imaging system and avoiding mistakes in selecting appropriate dichroic beam splitters and emission filters are improved by employing the identification device. According to a further variant, the carrier wheel device comprises at least one position marker, like e.g. an optical code and/or a reflector, which is readable by an encoder device included in the casing. Advantageously, this facilitates a precise control and testing of the correct operational position of the carrier wheel device in the casing.

According to a further preferred embodiment of the invention, the carrier wheel device comprises the carrier wheel casing, wherein the rotatable wheels are rotatably supported in the carrier wheel casing. The carrier wheel casing is provided with a drive device including at least one drive motor for moving the rotatable wheels to selected operational positions. The carrier wheel casing is configured for guiding the rotation of the rotatable wheels. Preferably, with the provision of the first and second rotatable wheels, the carrier wheel casing provides a bearing accommodating the first and second rotatable wheels along the circumferential edge thereof. Accordingly, the drive device can be provided with a radial distance from the rotation axes of the first and second rotatable wheels. Advantageously, this additionally contributes to the compact structure of the imaging system.

Advantageously, the imaging system of the invention can be adapted for providing separate first and second optical axes towards the camera device or for combining the first and second optical axes, in particular as disclosed in EP 2 369 401 A1. In the first case, with a preferred embodiment of the invention, the camera device comprises a first detector camera and a second detector camera, which are arranged for collecting the detection light travelling on the first and second optical axes, respectively. In the second case, the camera device comprises one single detector camera being arranged for collecting the detection light travelling on both of the first and second optical axes being combined before the camera device.

According to a second general aspect of the invention, the above objective is solved by a method of confocal imaging an object under investigation, wherein the spatio-temporally light modulated imaging system according to the above first aspect of the invention is used. In particular, the confocal imaging method comprises the following steps.

Firstly, the rotatable wheels are adjusted within the casing for selecting one of the pairs of first and second dichroic beam splitters and one of the pairs of the first and second emission filters in dependency on the spectral characteristics thereof and the spectral absorption and emission parameters of the object under investigation. Optionally, the carrier wheel device is provided with appropriate dichroic beam splitters and emission filters before introducing it into the casing.

Secondly, the imaging system is operated according to one of the operation modes described in EP 2 369 401 A1, including operating the light modulating micro-mirror device with an individual switching of the mirror elements between first and second tilting angles relative to the modulator optical axis, focusing illumination light onto the object under investigation, directing detection light from the object under investigation via the micro-mirror device and the first and second optical relaying devices towards the camera device and collecting the detection light with the camera device. On the basis of the collected detection light, the confocal image of the object to be obtained is reconstructed.

According to a third general aspect of the invention, the above objective is solved by a carrier wheel device, in particular a filter wheel device, being configured for carrying optical members and comprising a first rotatable wheel being configured for accommodating a plurality of first optical members, and a carrier wheel casing accommodating the first rotatable wheel, wherein the carrier wheel casing provides an outer bearing supporting the first rotatable wheel in a rotatable manner and a drive device being arranged in an off-axis position for driving the first rotatable wheel by acting on the first rotatable wheel at a peripheral edge thereof. Preferably, the carrier wheel device, in particular including at least one of the following features thereof, is provided in the spatio-temporally light modulated imaging system of the first general aspect of the invention.

Advantageously, the carrier wheel device with the outer bearing and the off-axis position of the drive device provides a compact structure which easily can be integrated in an optical system. In particular, as the axial portion of the carrier wheel device is free of components, the compact construction adjacent to further components of the optical system is facilitated. Furthermore, the carrier wheel casing fulfills a double function in terms of holding the rotatable wheel and driving the rotatable wheel.

Preferably, the carrier wheel device comprises two rotatable wheels, which can be adjusted independently of each other. Additionally to the first rotatable wheel, a second rotatable wheel is provided which is configured for accommodating a plurality of second optical members. The second rotatable wheel is arranged in the carrier casing adjacent to the first rotatable wheel and supported by the outer bearing in a rotatable manner. The first and second rotatable wheels are arranged parallel to each other with a common rotation axis. Preferably, they have the same diameter. The first optical members are arranged on a first side of the carrier wheel device and the second optical members are arranged on a second side of the carrier wheel device opposite to the first side thereof. The drive device is arranged for driving both of the first and second rotatable wheels at the peripheral edges thereof.

Preferably the optical members comprise dichroic beam splitters and/or optical filters. With a, particularly preferred example, the first optical members on a first side of the carrier wheel device comprise dichroic beam splitters with different spectral characteristics, and the second optical members on a second side of the carrier wheel device comprise optical filters with different spectral characteristics. With alternative embodiments, other optical members can be provided, like e. g. polarizer and/or grey scale filters.

As the axial portion of the carrier wheel device is free of components, the carrier wheel device can be configured with a through-hole in the centre thereof. The through-hole runs through the first and second rotatable wheels, providing a passage, which advantageously can be used for at least one additional beam path through the carrier wheel device, and/or accommodating electrical lines, mechanical components and/or thermal lines, like heat pipes.

Advantageously, the common accommodation of the first and second rotatable wheels in a common carrier wheel casing provides a compact structure of the carrier wheel device with multiple operational positions of the first and second optical members.

According to a preferred embodiment of the inventive carrier wheel device, the outer bearing comprises bearing rollers arranged in the carrier wheel casing. Preferably, three bearing rollers are provided supporting the first rotatable wheel or both of the first and second rotatable wheels. If the bearing rollers comprise a first displaceable bearing roller supporting the first rotatable wheel at a first azimuthal bearing position, and optionally a second displaceable bearing roller supporting the second rotatable wheel at a second azimuthal bearing position, while two fixed bearing rollers supporting the first rotatable wheel or both of the first and second rotatable wheels being arranged in a rotatable manner at further azimuthal positions, advantages for adjusting the rotatable wheel(s) are obtained. The first and the optional second displaceable bearing rollers are arranged in a rotatable and radially shiftable manner. Advantageously, they can be used for adjusting the clearance and bearing force of each rotatable wheel.

According to a particularly preferred embodiment of the invention, at least one of the first and second displaceable bearing rollers is adapted for a manual radial displacement between a support condition wherein the associated rotatable wheel is supported by the outer bearing and a release condition wherein the associated rotatable wheel can be removed from the outer bearing. The displaceable bearing roller being adapted for the manual radial displacement preferably is supported by a slider base allowing a fixation or a release of the displaceable bearing roller by the effect of manually operable screws, like knurled head screws.

According to a further preferred embodiment of the invention, the drive device comprises at least one stepping motor carrying a frictional wheel coupled with at least one of the first and second rotatable wheels, wherein the at least one stepping motor is arranged in a spring-loaded pivotable manner at the carrier wheel casing. Advantageously, the frictional wheel is urged by the spring-loaded pivotable stepping motor against the rotatable wheel.

If, according to a further preferred feature of the invention, the at least one stepping motor is carried by a spring-loaded lever on the first side of the carrier wheel casing and the frictional wheel is arranged on the second opposite side of the carrier wheel casing, advantages for a compact structure of the carrier wheel device are obtained.

Preferably, the carrier wheel casing is configured for arranging the rotatable wheel(s) relative to parallel first and second optical axes having a mutual distance. To this end, the carrier wheel casing has a first optical axis passage and a second optical axis passage, wherein the first rotatable wheel is configured for simultaneous positioning one of the first optical members in the first optical axis passage and another one of the first optical members in the second optical axis passage, and the optional second rotatable wheel is configured for simultaneous positioning one of the second optical members in the first optical axis passage and another one of the second optical members in the second optical axis passage. Preferably, each rotatable has an even number of through-holes, where one of the first and second optical members is arranged. In this case, the first optical axis passage and the second optical axis passage can be arranged opposite to each other relative to the axis of the rotatable wheel(s).

Advantageously, the carrier wheel casing can be provided with a cover wall carrying optical lenses being aligned with the first and second optical axis passages. The optical lenses can be used for imaging and/or correcting the light field traveling along the first and second optical axes. They can include a pivotable cover lid, allowing the removal or insertion of at least one of the rotatable wheels.

According to further preferred features of the invention, the carrier wheel device can be provided with at least one of the features mentioned above with reference to the first general aspect of the invention. The first and the optional second rotatable wheel can carry at least one position marker being readable by an encoder device. Alternatively or additionally, the first and the optional second rotatable wheel can have fitting frames each of which being arranged for accommodating one of the first or second optical members. Preferably, the fitting frames can be individually inserted into or removed from the first rotatable wheel. Advantageously, this facilitates the exchange of single optical members. Furthermore, the fitting frames can comprise a unique identification devices, like an RFID chip, being readable by a reader device within the carrier wheel casing.

Figure 2:
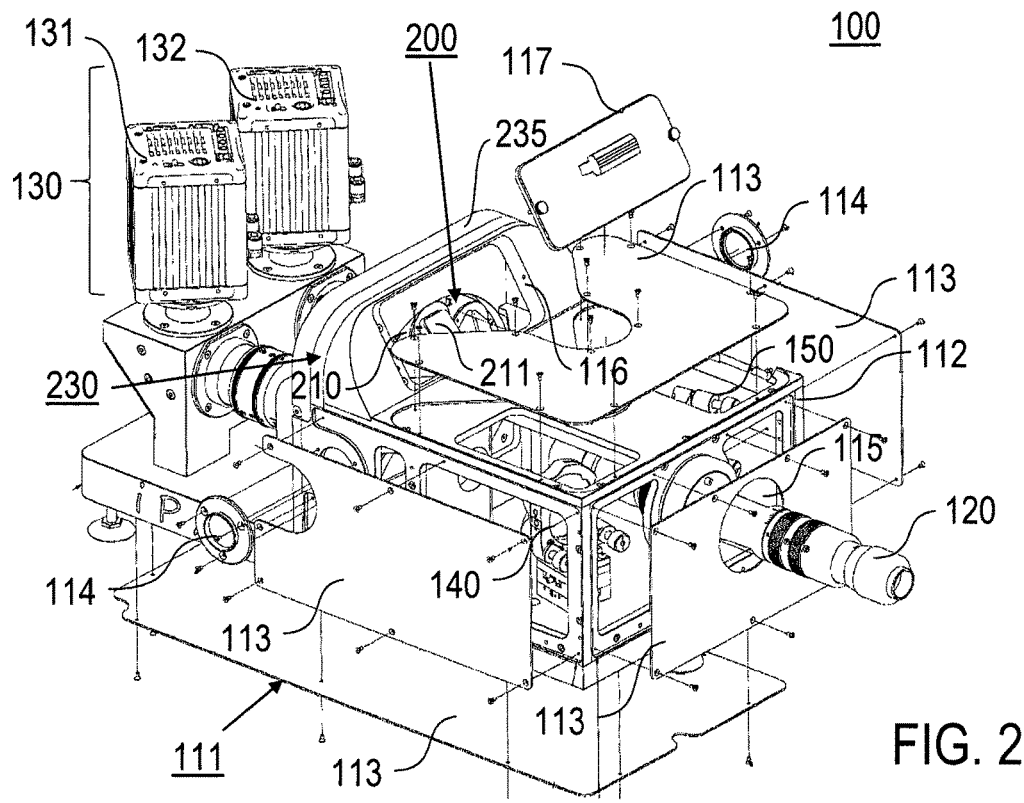
Figure 3:
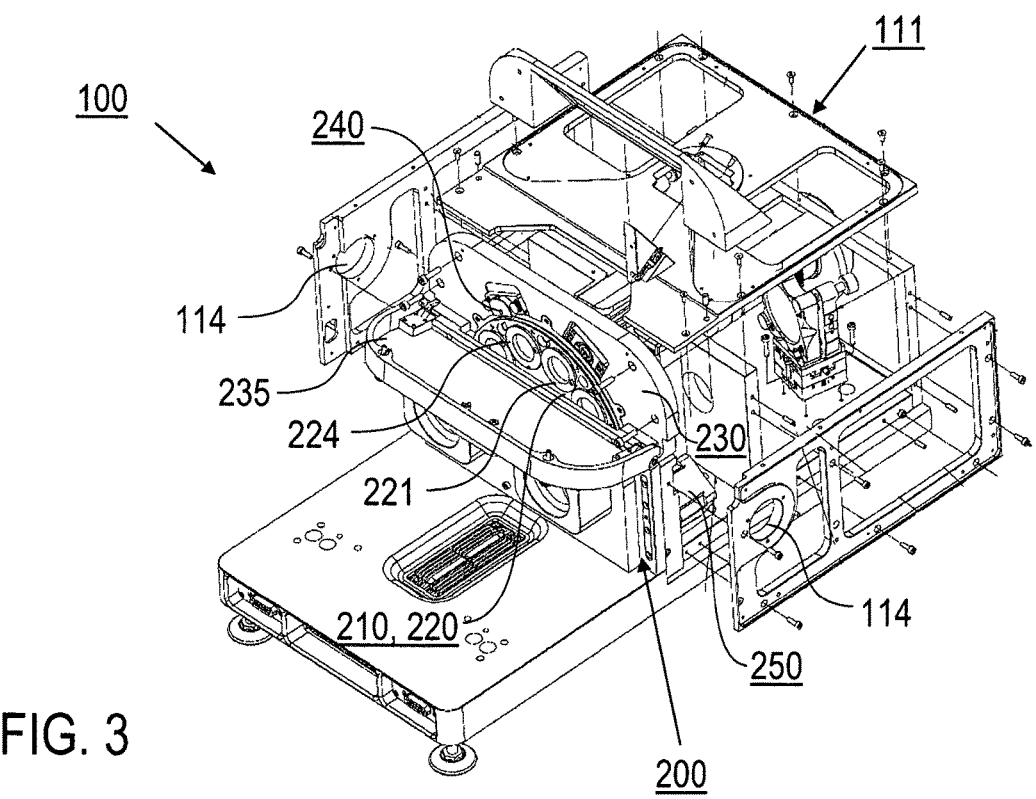
Figure 5:
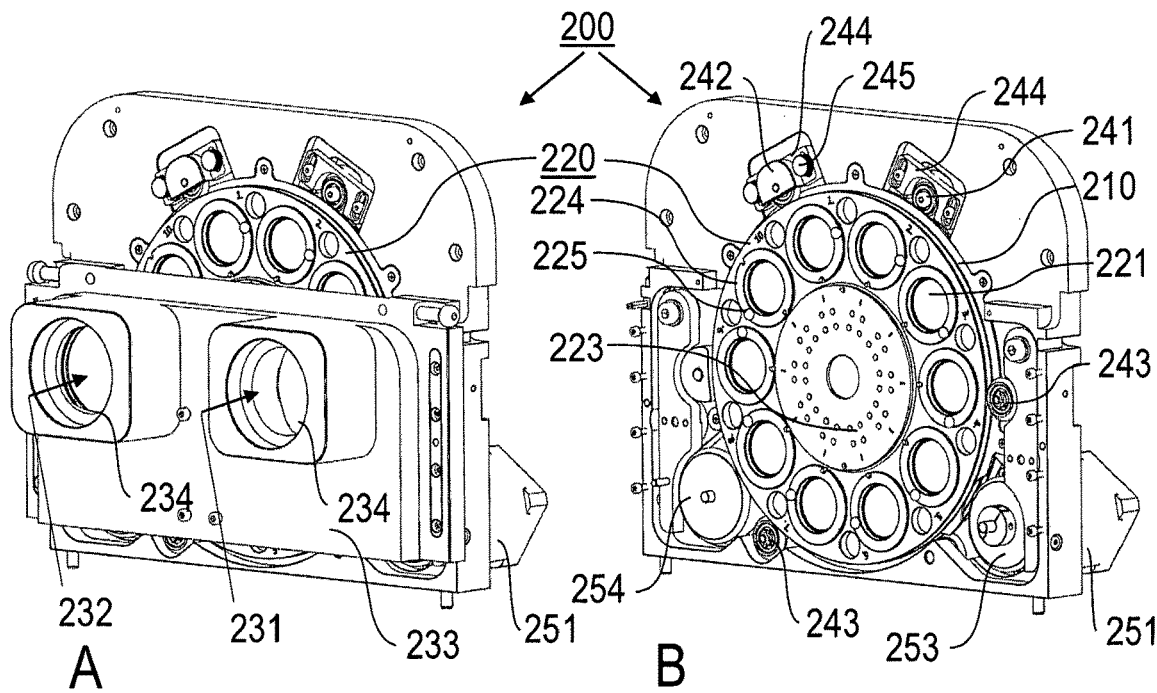
Figure 6:
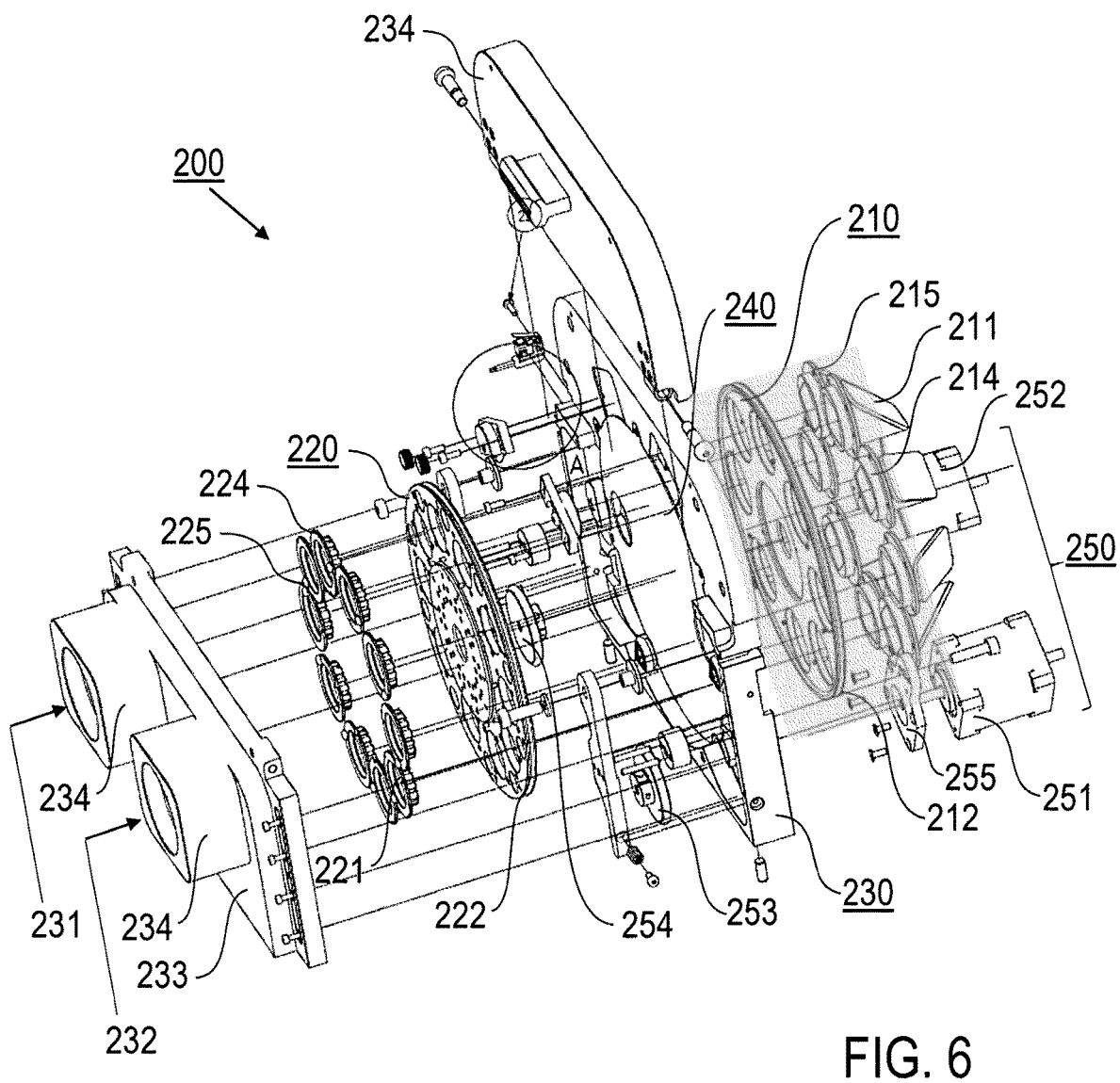

Further details and advantages of the invention are described in the following with reference to the attached drawings, which show in:

FIG. 1: a schematic top view of the imaging system according to a preferred embodiment of the invention;

FIG. 2: an exploded perspective view of an imaging system according to a preferred embodiment of the invention;

FIG. 3: an exploded partial perspective view of the imaging system according to FIG. 2;

FIG. 4: a perspective view of a carrier wheel device according to the invention from a first side thereof;

FIGS. 5A and 5B: perspective views of the carrier wheel device according to the invention from a second side thereof; and FIG. 6: an exploded perspective view of the carrier wheel device according to the invention.

Features of preferred embodiments of the invention are described in the following with particular reference to the provision of the main casing and the carrier wheel device holding the dichroic beam splitters and the emission filters in a spatio-temporally light modulated imaging system. Further details of the imaging system and the operation thereof are not described as they are implemented as described in EP 2 369 401 A1, which is introduced to the present specification by reference. In particular, the imaging system of the invention has an optical set-up as illustrated in FIG. 1 or 4 of EP 2 369 401 A1. Confocal imaging using an illumination with a pattern sequence of illumination spots is conducted and optical sectioning images are reconstructed according to one of the methods described in EP 2 369 401 A1, EP 911 667 A1 and EP 916 981 A1, which are introduced to the present specification by reference.

It is emphasized that the carrier wheel device represents an independent subject of the invention, which can be employed not only in the spatio-temporally light modulated imaging system, but also in other optical systems, like microscopes or spectroscopy devices including exchangeable optical members. With regard to the spatio-temporally light modulated imaging system, the optical members comprise dichroitic beam splitters and emission filters. With other applications of the carrier wheel device, other optical members can be used, like polarizers.

While exemplary reference is made in the following to a carrier wheel device comprising two rotatable wheels, the invention correspondingly can be implemented in a modified embodiment with a carrier wheel device comprising one single rotatable wheel, in particular with one single drive motor and three bearing rollers.

According to FIG. 1, the imaging system 100 has an optical set-up like the imaging system shown in FIG. 4 of EP 2 369 401 A1. With more details, the imaging system 100 comprises the light modulating micro-mirror device 110, the imaging optic 120, preferably including a telecentric optic, a camera device 130, including a first detector camera 131 and a second detector camera 132, a first optical relaying device 140, including an imaging reflective optic 141 and an imaging refractive optic 142, a second optical relaying device 150, including an imaging reflective optic 151 and an imaging refractive optic 152, the carrier wheel device 200 carrying pairs of first and second dichroic beam splitters 211 and pairs of first and second emission filters 221, the illumination device including a first illumination source 171 and a second illumination source 172, a carrier wheel casing 230 of the carrier wheel device 200 and a control device 190. As shown in FIG. 1, the imaging refractive optics 142, 152 can be arranged between the first and second emission filters 221 and the first and second detector cameras 131, 132 (see optical lenses 234 in FIGS. 5A and 6). Alternatively, the imaging refractive optics 142, 152 can be arranged in another section of the first and second optical axes between the dichroic beam splitters 211 and the reflective optics 141, 151.

The micro-mirror device 110 and the first and second optical relaying devices 140, 150 are enclosed by a main casing 111, which is described with further details with reference to FIGS. 2 and 3 below, and the carrier wheel device 200, which is described with further details with reference to FIGS. 4 to 6 below. The carrier wheel device 200 can be completely included in the main casing 111 (as shown in FIG. 1), or it may provide a portion of the main casing 111 (as shown in FIGS. 2 and 3).

The first and second illumination sources 171, 172 comprise at least one of single laser diodes, single light emitting diodes, an array of laser diodes and an array light emitting diodes, optionally combined with an illumination wavelength selecting device. The first and second detector cameras 131, 132 comprise e. g. CCD- or CMOS cameras. The micro-mirror device 110 is e. g. a DMD of the manufacturer Texas Instruments.

The components 110, 120, 130, 140 and 150 of the imaging system 100 are arranged such that the modulator optical axis 121 (optical axis of the imaging optic 120), the first optical axis 143 and the second optical axis 153 are arranged within a common reference plane (horizontal plane, drawing plane in FIG. 1) perpendicular to the modulator plane of the micro-mirror device 110. A first illumination path is spanned from the first illumination source 171 via the first dichroic beam splitter 211, the first optical relaying device 140, the micro-mirror device 110 and the imaging optic 120 to the object 1 under investigation. A second illumination path is spanned from the second illumination source 172 via the second dichroic beam splitter 211, the second optical relaying device 150, the micro-mirror device 110 and the imaging optic 120 to the object 1. In opposite directions, detection paths are provided from the object 1 via the imaging optic 120, the micro-mirror device 110, the first and second optical relaying device 140, 150, the first and second dichroic beam splitters 211 and the first and second emission filters 221 to the first and second detector cameras 131, 132, respectively.

Portions of the illumination and detection paths outside the casing 111 are shielded by the imaging optic 120 and camera optics 133, 134, provided with shiftable shielding sheaths (see FIG. 2). The illumination sources 171, 172 can be directly coupled to the casing 111, wherein illumination light is introduced through illumination ports 114 (see FIGS. 2, 3) to the first and second dichroic beam splitters 211.

With a preferred embodiment of the confocal imaging method, the micro-mirror device 110 with the mirror elements being switched in a first state with a first tilting angle relative to the modulator optical axis 121 and the first optical relaying device 140 are adapted for collecting detection light from non-conjugate locations within the object 1, while the micro-mirror device 110 with the mirror elements being switched in a second state with a second tilting angle relative to the modulator optical axis 121 and the second optical relaying device 150 are adapted for collecting detection light from conjugate locations in the object 1. The non-conjugate contributions are collected with the first detector camera 131, and the conjugate contributions are collected with the second detector camera 132. On the basis of the image signals of the first and second detector cameras 131, 132, the confocal image of the object 1 is reconstructed, e.g. with a computer circuit included in the control device 190.

The carrier wheel device 200 includes a first rotatable wheel 210 and a second rotatable wheel 220, which are accommodated by the carrier wheel casing 230 (see FIGS. 4 to 6). The rotatable wheels 210, 220 are arranged adjacent to each other with a common rotation axis 201 extending within the reference plane including the modulator optical axis 121 and the first and second optical axes 143, 153. Each of the rotatable wheels 210, 220 has eight or ten through holes being pairwise arranged in radial direction in opposite relationship to each other (see FIGS. 4 to 6). The through holes are adapted for accommodating fitting frames 214, 224 (see FIG. 6) each of which carrying one dichroic beam splitter 211 or one emission filter 221.

Accordingly, with the illustrated example, the first rotatable wheel 210 is adapted for accommodating four pairs of first dichroic beams splitters 211 to be arranged in the first optical axis 143 and second dichroic beam splitters 211 to be arranged in the second optical axis 153. The first and second dichroic beam splitters 211 are arranged such that illumination light from the illumination sources 171, 172 is reflected onto the first and second optical axes 143, 153, respectively. Each pair of first and second dichroic beam splitters 211 has a specific spectral characteristic, in particular specific wavelength ranges for reflecting illumination light and transmitting detection light. Preferably, the first and second dichroic beam splitter 211 providing one of the pairs of mutually opposite dichroic beam splitters 211 have the same spectral characteristic. Dichroic beam splitters 211 with an appropriate spectral characteristic are selected in dependency on the spectral absorption and emission features of the object 1, which determine the illumination wavelength to be reflected onto the first and optical axes 143, 153 and the detection wavelength to be transmitted to the camera device 130.

The second rotatable wheel 220 comprises through holes for accommodating fitting frames 224 including emission filters 221. The number and azimuthal positions of the through holes of the first and second rotatable wheels 210, 220 are equal, so that the detection light can pass through the first and second dichroic beam splitters 211 and the first and second beam splitters 221 at each operational position of the carrier wheel device 160. Emission filters 221 with an appropriate spectral characteristic are selected and combined with dichroic beam splitters 211 in dependency on the spectral absorption and emission features of the object 1.

FIG. 1 shows a schematically illustrated reader device 261 within the casing 111. The reader device 261 is adapted for reading at least one unique identification device 215, 225, like e.g. an RFID chip integrated in one or both of the first and second rotatable wheels 210, 220, in particular on the wheels and/or each of the fitting frames 214, 224. Furthermore, an encoder device 260 is schematically shown, which is arranged for reading at least one position marker 213, 223 (see FIGS. 4 and 5B) on one or both of the first and second rotatable wheels 210, 220. The encoder device 260 comprises e.g. a single photodiode, a matrix of photodiodes and/or a CCD-based encoder.

The rotatable wheels 210, 220 can be manually adjusted within the carrier wheel casing 230. Alternatively, according to a preferred embodiment of the invention, the drive device 250 including two drive motors 251, 252 (see FIGS. 4 to 6) which are provided for a motorized rotation of the first and second rotatable wheels 210, 220. The drive motors 251, 252 are controlled in dependency on spectral wavelength ranges required for the current task of the imaging system 100 and the output of the reader device 261 and the encoder device 260.

FIG. 2 illustrates a perspective view of a preferred embodiment of the imaging system 100, in particular showing the imaging optic 120, the camera device 130 with the first detector camera 131 and the second detector camera 132, the first optical relaying device 140, the second optical relaying device 150 and the carrier wheel device 200. The micro-mirror device (not shown) and the first and second optical relaying devices 140, 150 are included in the casing 111 which is shown in an exploded view. The casing 111 includes a casing frame 112 and casing walls 113, which are completed with the carrier wheel device 200. The casing walls 113 include illumination ports 114 (see also FIG. 3), an imaging optic port 115 and an access port 116 (see also FIG. 3). The illumination ports 114 are configured for coupling the illumination sources 171, 172 with the casing 111 and introducing illumination light onto the first and second dichroic beam splitters 211 (see also FIGS. 1 and 2). The imaging optic port 115 is a through hole accommodating the imaging optic 120. The access port 116 can be opened or closed with an access port cover 117 for exchanging at least one of the dichroic beam splitters 211. A further port is provided by a pivotable cover lid 235 of the carrier wheel casing 230 for removing or inserting the second rotatable wheel (not shown in FIG. 2) from or into the carrier wheel casing 230 (see also FIGS. 3 and 5).

FIG. 3 is another perspective illustration of the imaging system 100 with the exploded view of the casing 111, which is shown with an open cover lid 235 and without the camera device and the camera optic thereof. The rotatable wheels 210, 220 of the carrier wheel device 200 are held in an outer bearing 240 provided by the carrier wheel casing 230 as described with further details below with reference to FIGS.

4 to 6. If the cover lid 235 is open, the second rotatable wheel 220 carrying the emission filters 221 in circular fitting frames 224 can be taken from the carrier wheel casing 230.

Further details of the carrier wheel device 200 are illustrated in FIGS. 4 to 6. The carrier wheel device 200 comprises the first rotatable wheel 210 carrying an even number of first optical members 211, like dichroitic beam splitters (see FIGS. 4, 6), the second rotatable wheel 220 carrying an even number of second optical members 221, like emission filters (see FIGS. 5, 6), and a carrier wheel casing 230 accommodating the first and second rotatable wheels 210, 220. The carrier wheel casing 230 has a plate shape. It comprises the outer bearing 240 holding the first and second rotatable wheels 210, 220. Furthermore, it comprises the drive device 250 being arranged for driving the first and second rotatable wheels 210, 220 at peripheral edges 212, 222 thereof by the effect of frictional wheels 253, 254 (see FIGS. 5B, 6).

The first and second rotatable wheels 210, 220 have through-holes at the azimuthal positions where the optical components are to be arranged, thus providing a first optical axis passage 231 and a second optical axis passage 232 of the carrier wheel device 200 (see FIGS. 5A, 6). In each through-hole, a fitting frame 214, 224 (see FIG. 6) is arranged, e. g. hold by spring force. Each fitting frame 214, 224 accommodates one of the optical components, e. g. using magnetic forces. Furthermore, each fitting frame 214, 224 is provided with a RFID chip 215, 225, which includes a storage with unique data identifying the associated optical component. The RFID chips 215, 225 are readable with a reader device 261 with four reader units (see FIG. 1) arranged in the surrounding of the carrier wheel device 200, e. g. in the imaging system 100 or another optical system, adjacent to the first and second rotatable wheels 210, 220.

Each of the first and second rotatable wheels 210, 220 has a central through-hole 202 providing a central passage of the carrier wheel device 200. Contrary to conventional filter wheels, both of the drive device and the bearing device of the inventive carrier wheel device are arranged at an outer edge of the carrier wheels, so that the central passage is free of any drive and bearing devices. With the provision of a corresponding hole in the cover plate 233, the central passage can be used for guiding electrical, optical or thermal lines there through.

The fitting frames 214 carrying dichroitic beam splitters 211 can be adapted with a geometric feature, like a protrusion, matched to a complementary geometric feature of the through-hole of the first rotatable wheel 210, thus facilitating a correct placement of the dichroitic beam splitters 211 on the first rotatable wheel 210 such that the reflecting surfaces of the dichroitic beam splitters 211 are arranged for reflecting light from a radial direction onto one of the first and second optical axes 143, 153.

As shown in FIG. 5B, the outer bearing 240 comprises a first displaceable bearing roller 241 holding the first rotatable wheel 210 at a first azimuthal bearing position, a second displaceable bearing roller 242 holding the second rotatable wheel 220 at a second, different azimuthal bearing position, and two fixed bearing rollers 243 holding both of the first and second rotatable wheels 210, 220 at further azimuthal bearing positions. The first and second displaceable bearing rollers 241, 242 are supported in the carrier wheel casing 230 in a rotatable and radially shiftable manner. Due to the support and adjustable fixation on slider bases 244, the first and second displaceable bearing rollers 241, 242 are capable of a manual radial displacement between a support condition wherein the associated rotatable wheel 210 or 220 is supported by the outer bearing 230 and a release condition wherein the associated rotatable wheel can be removed from the outer bearing 230. For facilitating the removal, in particular through the open cover lid 235, the displaceable bearing roller 242 is fixed to the slider base 244 by manually operable knurled head screws 245.

The drive device 250 comprises two drive motors 251, 252, in particular stepping motors, each carrying a frictional wheel 253, 254 on a motor axis (see FIG. 5B). The frictional wheels 253, 254 are urged by the effect of spring loading the drive motors 251, 252 to the outer edges 212, 222 of the first and second rotatable wheels 210, 220. Spring loading and pivoting the drive motors 251, 252 is obtained by spring-loaded levers 255, 256 (see FIG. 4) supported by the carrier wheel casing 230. The spring-loaded levers 255, 256 are arranged in corners on a first side of the carrier wheel casing 230, while the frictional wheels 253, 254 are arranged on the second opposite side of the carrier wheel casing. The drive motors 251, 252 are controlled by the control device 190 (see FIG. 1) such that a selected one of the pairs of first and second dichroic beam splitters (see FIG. 6) accommodated by fitting frames 214 and the first and second emission filters 221 accommodated by fitting frames 224 are arranged in the first and second optical axes 143, 153 of the carrier wheel device 200, respectively.

The first and second rotatable wheels 210, 220 carry position markers 213, 223 (see FIGS. 4, 5B), comprising dot-shaped reflectors on the surface of the first and second rotatable wheels 210, 220. Each of the position markers 213, 223 is assigned to one position of a dichroic beam splitter 211 or emission filter 221 on the rotatable wheels 210, 220. The dot-shaped reflectors 213, 223 can be used as a code representing the particular position of an associated dichroic beam splitter 211 or emission filter 221.

FIGS. 4, 5A and 6 show a cover plate 233 on the second side of the carrier wheel casing 230. An upper portion of the cover plate 233 provides the pivotable lid 235 (see FIGS. 4 and 6) allowing an access to the second rotatable wheel 220. The lower portion of the cover plate 233 carries optical lenses 234 (providing the imaging refractive optics 142), which are provided e.g. for light field correction purposes.

The features of the invention disclosed in the above description, the drawings and the claims can be of significance both individually as well as in combination or sub-combination for the realization of the invention in its various embodiments.

The invention claimed is:

1. Spatio-temporally light modulated imaging system, in particular configured for confocal imaging an object to be investigated, comprising:

a light modulating micro-mirror device comprising an array of mirror elements arranged in a modulator plane, wherein each of the mirror elements can be switched individually between first and second states with first and second tilting angles, respectively, relative to a modulator optical axis perpendicular to the modulator plane, an imaging optic being arranged for focusing illumination light from the micro-mirror device onto the object and directing detection light created in the object in response to the illumination light towards the micro-mirror device, a camera device including at least one detector camera being arranged for collecting the detection light travelling via the mirror elements in the first state and a first optical relaying device on a first optical axis deviating from the modulator optical axis, and for collecting the detection light travelling via the mirror elements in the second state and a second optical relaying device on a second optical axis deviating from the modulator optical axis, a carrier wheel device being arranged for carrying multiple pairs of first and second dichroic beam splitters and multiple pairs of first and second emission filters, wherein the carrier wheel device is adjustable in multiple operational positions relative to the first and second optical axes such that in each operational position one of the pairs of first and second dichroic beam splitters is arranged in the first and second optical axes for directing illumination light from first and second light source devices via the first and second optical relaying devices towards the micro-mirror device, respectively, and one of the pairs of first and second emission filters is arranged in the first and second optical axes for filtering detection light before collected with the camera device, and a casing accommodating the light modulating micro-mirror device, the first and second optical relaying devices and including the carrier wheel device.

2. Imaging system according to claim 1, wherein
the carrier wheel device comprises a first rotatable wheel carrying the pairs of first and second dichroic beam splitters and a second rotatable wheel carrying the pairs of first and second emission filters.

3. Imaging system according to claim 1, wherein
the carrier wheel device is arranged such that the selected one of the pairs of first and second dichroic beam splitters and the selected one of the pairs of first and second emission filters are positioned around a location of minimum light beam diameters along the first and second optical axes, respectively.

4. Imaging system according to claim 1, wherein
the carrier wheel device comprises fitting frames each of which being arranged for accommodating one of the first and second dichroic beam splitters and emission filters.

5. Imaging system according to claim 4, wherein
the filters are mounted in the fitting frames using an isotropic spring loaded mechanism.

6. Imaging system according to claim 4, wherein
the fitting frames can be individually inserted into or removed from the carrier wheel device.

7. Imaging system according to claim 4, wherein
at least one of the first and second dichroic beam splitters and emission filters are exchangeable.

8. Imaging system according to claim 4, wherein
at least one of the first and second dichroic beam splitters and the emission filters are held in the fitting frames by magnetic forces.

9. Imaging system according to claim 2, wherein
at least one of the first and second rotatable wheels is removable from the carrier wheel device.

10. Imaging system according to claim 1, wherein
the fitting frames comprise unique identification devices, including RFID chips, being readable by a reader device included in the casing.

11. Imaging system according to claim 1, wherein
the carrier wheel device comprises at least one position marker being readable by an encoder device included in the casing.

12. Imaging system according to claim 1, wherein
the carrier wheel device comprises a carrier wheel casing being provided with a drive device for moving the first and second dichroic beam splitters and the first and second emission filters to the operational positions thereof.

13. Imaging system according to claim 12, wherein
the carrier wheel device comprises the first and second rotatable wheels, and
the carrier wheel casing provides an outer bearing accommodating the first and second rotatable wheels along the circumferential edges thereof.

14. Imaging system according to claim 1, wherein the camera device comprises
a first detector camera being arranged for collecting the detection light travelling on the first optical axis, and
a second detector camera being arranged for collecting the detection light travelling on the second optical axis.

15. Method of confocal imaging an object to be investigated, using a spatio-temporally light modulated imaging system according to claim 1, comprising the steps of
adjusting the carrier wheel device for selecting one of the pairs of first and second dichroic beam splitters and one of the pairs of the first and second emission filters,
operating the light modulating micro-mirror device, wherein each of the mirror elements are switched individually between the first and second states with first and second tilting angles, respectively, relative to the modulator optical axis perpendicular to the modulator plane,
focusing illumination light from the micro-mirror device onto the object and directing detection light created in the object in response to the illumination light towards the micro-mirror device,
collecting the detection light travelling via the mirror elements in the first state and the first optical relaying device on a first optical axis deviating from the modulator optical axis, and the detection light travelling via the mirror elements in the second state and a second optical relaying device on a second optical axis deviating from the modulator optical axis, and
reconstructing a confocal image of the object based on the collected detection light.

16. Carrier wheel device being configured for carrying optical members, comprising
a first rotatable wheel being configured for accommodating a plurality of first optical members;
a carrier wheel casing accommodating the first rotatable wheel,
the carrier wheel casing including an outer bearing supporting the first rotatable wheel in a rotatable manner and a drive device being arranged for driving the first rotatable wheel at a peripheral edge thereof,
the outer bearing including bearing rollers arranged in the carrier wheel casing,
the bearing rollers including a first displaceable bearing roller being arranged in a rotatable and radially shiftable manner for supporting the first rotatable wheel at a first azimuthal bearing position, and two fixed bearing rollers being arranged in a rotatable manner for supporting the first rotatable wheel at further azimuthal positions,
a second rotatable wheel; and
a second displaceable bearing roller arranged in a rotatable and radially shiftable manner for supporting the second rotatable wheel at a second azimuthal bearing positions;

the fixed bearing rollers being arranged for supporting the first rotatable wheel and the second rotatable wheel.

17. Carrier wheel device according to claim 16, further comprising
the second rotatable wheel being configured for accommodating a plurality of second optical members, wherein
the second rotatable wheel is accommodated by the carrier wheel casing, the second rotatable wheel being arranged adjacent to the first rotatable wheel and supported by the outer bearing in a rotatable manner, and
the drive device is arranged for driving the second rotatable wheel at a peripheral edge thereof.

18. Carrier wheel device according to claim 16, wherein at least one of the first and second displaceable bearing rollers is adapted for a manual radial displacement between a support condition wherein the associated rotatable wheel is supported by the outer bearing and a release condition wherein the associated rotatable wheel can be removed from the outer bearing.

19. Carrier wheel device according to claim 16, wherein the drive device comprises at least one drive motor being arranged for driving a frictional wheel coupled with one of the first and second rotatable wheels, and
the at least one drive motor is arranged in a spring-loaded pivotable manner at the carrier wheel casing.

20. Carrier wheel device according to claim 19, wherein the at least one drive motor is carried by a spring-loaded lever, and
the at least one drive motor with the associated spring-loaded lever is located on a first side of the carrier wheel casing and the frictional wheel is arranged on a second opposite side of the carrier wheel casing.

21. Carrier wheel device according to claim 16, wherein the carrier wheel casing has a first optical axis passage and a second optical axis passage, and
the first rotatable wheel is configured for simultaneous positioning one of the first optical members in the first optical axis passage and another one of the first optical members in the second optical axis passage.

22. Carrier wheel device according to claim 21, wherein the second rotatable wheel is provided, and
the second rotatable wheel is configured for simultaneous positioning one of the second optical members in the first optical axis passage and another one of the second optical members in the second optical axis passage.

23. Carrier wheel device according to claim 21, wherein the carrier wheel casing has a cover wall carrying optical lenses being aligned with the first and second optical axis passages.

24. Carrier wheel device according to claim 16, wherein the optical members comprise one of dichroic beam splitters and optical filters.

25. Carrier wheel device according to claim 16, wherein the carrier wheel device has a through-hole in the centre thereof.

26. Carrier wheel device according to claim 16, wherein the first rotatable wheel carries at least one position marker being readable by an encoder device.

27. Carrier wheel device according to claim 16, wherein the first rotatable wheel has fitting frames each of which being arranged for accommodating one of the first optical members.

28. Carrier wheel device according to claim 27, wherein the fitting frames can be individually inserted into or removed from the first rotatable wheel.

29. Carrier wheel device according to claim 28, wherein the fitting frames comprise unique identification devices, including RFID chips, being readable by a reader device.

30. Carrier wheel device according to claim 26, wherein the second rotatable wheel is provided, and
the second rotatable wheel carries at least one position marker being readable by at least one of the encoder device, and the second rotatable wheel has the fitting frames.

31. Carrier wheel device according to claim 16, the carrier wheel device being configured for carrying a filter wheel device.

* * * * *